(12) United States Patent
Lange (10) Patent No.: US 11,790,662 B2
(45) Date of Patent: Oct. 17, 2023

(54) METHOD AND DEVICE FOR DETERMINING A MOTION STATE OF AT LEAST ONE OBJECT IN THE SURROUNDINGS OF A VEHICLE, AND METHOD AND DEVICE FOR ACTIVATING A VEHICLE SYSTEM OF A VEHICLE

(71) Applicant: Robert Bosch GmbH, Stuttgart (DE)

(72) Inventor: Oliver Lange, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 454 days.

(21) Appl. No.: 17/157,084

(22) Filed: Jan. 25, 2021

(65) Prior Publication Data

US 2021/0248388 A1    Aug. 12, 2021

(30) Foreign Application Priority Data

Feb. 8, 2020 (DE) .......................... 102020201569.4

(51) Int. Cl.
*G06V 20/56* (2022.01)
(52) U.S. Cl.
CPC ................... *G06V 20/56* (2022.01)
(58) Field of Classification Search
CPC ........ G06V 20/56; G06V 20/58; G06V 10/30; G06V 10/443; G06V 10/20; G06V 20/52; G06V 10/82; G06V 20/40; G06V 20/64; G06V 10/993; G06V 40/172; G06V 40/10; G06V 10/147; G06V 10/255; G06V 20/597; G06V 40/16; G06V 40/161; G06V 40/23; G06V 10/16; G06V 10/245; G06V 10/26; G06V 10/751; G06V 10/7515; G06V 10/764; G06V 10/774; G06V 20/60; G06V 20/80; G06V 20/95; G06V 40/1365;

(Continued)

(56) References Cited

U.S. PATENT DOCUMENTS

| 2002/0057195 A1* | 5/2002 | Yamamura | G01S 11/12 340/436 |
| 2010/0098297 A1* | 4/2010 | Zhang | B60W 30/09 382/104 |

(Continued)

*Primary Examiner* — Nimesh Patel
(74) *Attorney, Agent, or Firm* — NORTON ROSE FULBRIGHT US LLP; Gerard Messina (57) ABSTRACT

A method for determining a motion state of an object in the surroundings of a vehicle. The vehicle includes at least one vehicle camera for providing image data that represent the surroundings. Movability measures and pieces of quality information that are generated by processing the image data, are read in. The movability measures include generated continuous measured values for detecting moving object pixels, using correspondences, recognized using a correspondence algorithm, between pixels in successive images represented by the image data. Pixel-specific pieces of quality information are generated using the read-in pieces of quality information. The pixel-specific pieces of quality information indicate for each pixel the quality of the correspondences. A dynamic object probability is determined for each pixel, using the movability measures and the pixel-specific pieces of quality information. The dynamic object probability indicates for each pixel the probability of belonging to a moving object or to a static object.

11 Claims, 4 Drawing Sheets

(58) Field of Classification Search
CPC ........ G06V 40/15; G06V 40/20; G06V 40/70; G06V 40/67; G06V 10/141; G06V 20/10; G06V 10/462; G06V 10/449; G06T 2207/30261; G06T 7/277; G06T 7/254; G06T 2207/10016; G06T 7/20; G06T 1/00; G06T 1/20; G06T 7/00; G06T 2207/20084; G06T 15/005; G06T 2207/20081; G06T 2207/10024; G06T 7/215; G06T 17/00; G06T 2207/30196; G06T 7/248; G06T 7/596; G06T 2207/10012; G06T 7/593; G06T 7/70; G06T 7/97; G06T 2200/04; G06T 2207/20201; G06T 2207/30252; G06T 2219/024; G06T 2207/30168; G06T 2207/30232; G06T 2207/30236; G06T 7/579; G06T 7/251; G06T 7/80; G06T 13/20; G06T 7/75; G06T 7/85; G06T 2207/10028; G06T 7/269; G06T 2207/30241; G06T 2207/30244; G06F 18/2415; G06F 18/22; G06F 3/0237; G06N 3/08; G06N 20/00; G06N 3/045; G06N 7/01; G06N 20/20; G06N 3/008; G06N 3/0442; G06N 3/0455; G06N 3/088; B60W 50/14; B60W 2422/95; B60W 30/02; B60W 2420/52; B60W 10/20; B60W 10/18; B60W 2050/143; B60W 2420/42; B60W 2554/408; B60W 2552/53; B60W 2554/00; B60W 30/09; B60W 50/08; B60W 60/0015; G08G 1/166; G08G 1/165; G08G 1/16; G08G 1/00; G08G 1/0133; G08G 1/0141; G08G 1/0145; G08G 1/0175; B62D 15/0265; B62D 53/12; B62D 63/02; B62D 63/08
See application file for complete search history.

(56) References Cited

U.S. PATENT DOCUMENTS

| | | | | |
|---|---|---|---|---|
| 2011/0137527 | A1* | 6/2011 | Simon | G06V 20/64 701/1 |
| 2016/0358312 | A1* | 12/2016 | Kolb, V | G06T 5/003 |
| 2017/0323179 | A1* | 11/2017 | Vallespi-Gonzalez | B60R 11/04 |
| 2018/0218221 | A1* | 8/2018 | Mosher | G06V 20/49 |
| 2019/0056498 | A1* | 2/2019 | Sonn | G01S 17/931 |
| 2021/0056712 | A1* | 2/2021 | Daudelin | G01S 7/4808 |
| 2022/0017081 | A1* | 1/2022 | Yokoyama | G06V 10/273 |

* cited by examiner

METHOD AND DEVICE FOR DETERMINING A MOTION STATE OF AT LEAST ONE OBJECT IN THE SURROUNDINGS OF A VEHICLE, AND METHOD AND DEVICE FOR ACTIVATING A VEHICLE SYSTEM OF A VEHICLE

CROSS REFERENCE

The present application claims the benefit under 35 U.S.C. § 119 of German Patent Application No. DE 102020201569.4 filed on Feb. 8, 2020, which is expressly incorporated herein by reference in its entirety.

FIELD

The present invention is directed to a device and a method for determining a motion state of at least one object in the surroundings of a vehicle. The present invention also relates to a computer program.

BACKGROUND INFORMATION

Driver assistance functions and functions for automatic driving, for example, require in particular detection and description of the vehicle surroundings that is as accurate as possible. For example, a recognition of self-moving objects such as persons, cyclists, or other vehicles may be an integral part. In particular, cameras are regarded as a type of sensor for the surroundings detection, since they allow movement to be ascertained with high resolution. This takes place, for example, using correspondence methods, such as the so-called optical flow, by analyzing an image sequence. Geometric methods, for example, may be applied for recognizing self-moving objects. Self-moving objects may be recognized in that their movement (optical flow) observed in the image sequence is not explainable by the movement of the camera. However, results of the above-mentioned correspondence methods may be noisy or systematically false, which may result in incorrect or absent dynamic object detections.

SUMMARY

In accordance with example embodiments of the present invention, a method, a device that uses this method, and lastly, a corresponding computer program are provided. Advantageous refinements and enhancements of the method, device, and computer program are described herein.

According to specific embodiments of the present invention, in particular a camera-based detection of self-moving objects in the surroundings of a vehicle may be made possible, it being possible to ascertain a dynamic object probability (DOP) and an associated confidence for each recognized correspondence of pixels in successive images. For reducing noise effects, for example two algorithmic methods may be provided, one method being able to eliminate primarily random noise effects, and the other method being able to eliminate primarily systematic noise effects.

Since random noise effects may typically originate in the correspondence algorithm, for example optical flow, they may be compensated for via additional knowledge of a quality of the correspondence. When the quality of a correspondence measurement is poor, such a measurement should not be classified, or should be classified only with low probability, as belonging to a dynamic object, since it may be an incorrect or noisy measurement. For each measurement, conventional correspondence algorithms may additionally provide pieces of quality information that state how good, accurate, or plausible the particular measurement is. This may take place, for example, in the form of confidences, standard deviations, or abstract measures. The optical flow may provide pieces of quality information, for example, which may describe, for example, a measurement quality, a probability of ambiguity, and a temporal consistency. According to specific embodiments of the present invention, a compensation of systematic noise effects may take place using a separate algorithmic method, for example. In particular, a temporal consistency of dynamic objects and of the static world may be utilized. This is based, for example, on the assumption that correspondences that have been classified as static over an extended period of time are not very likely to suddenly become dynamic, or that a pixel previously classified as dynamic is more likely to be dynamic than static in the future. For utilization of the temporal consistency, chains of correspondences may be formed over an extended period of time as two successive images.

According to specific embodiments of the present invention, in particular a robust system for camera-based detection of self-moving or dynamic objects may advantageously be provided. A reliable camera-based detection of dynamic objects may be made possible, and improved robustness against the stated noise effects may be achieved. In particular, interference effects caused by random noise and systematic noise may be compensated for via a uniform approach for use in actual products. In particular an initial conversion of, for example, geometry-based movability measures or dynamic object measures such as the epipolar error into a dynamic object probability may advantageously result, since their temporal fusion, in contrast to geometry-based measures, is well-founded from the standpoint of mathematics and physics. Unlike the situation for an accumulation of epipolar errors, for example, such dynamic object probabilities, depending on the position in the image, proper motion of the camera, movement of the object, etc., cannot readily change, and may have no zero crossings. Such a dynamic object probability may describe an abstract probabilistic variable which may be in the value range between zero and one, for example, and which may therefore always be interpreted in the same way.

In accordance with an example embodiment of the present invention, a method for determining a motion state of at least one object in the surroundings of a vehicle is provided, the vehicle including at least one vehicle camera for providing image data that represent the surroundings, the method including the following steps:

Reading in movability measures and pieces of quality information that are generated by processing the image data, the movability measures including generated continuous measured values for detecting moving object pixels, using correspondences, recognized with the aid of a correspondence algorithm, between pixels in successive images represented by the image data, the pieces of quality information indicating a quality of the correspondences as a function of at least noise-related interfering influences;

Generating pixel-specific pieces of quality information using the read-in pieces of quality information, the pixel-specific pieces of quality information indicating for each pixel the quality of the correspondences; and Ascertaining a dynamic object probability for each pixel, using the movability measures and the pixel-specific pieces of quality information, the dynamic object probability indicating for each pixel, as the motion state, the probability of belonging to a moving object or to a static object.

This method may be implemented, for example, in software or hardware or in a mixed form of software and hardware, for example in a control unit or a device. The vehicle may be a motor vehicle, for example a passenger automobile or a commercial vehicle. In particular, the vehicle may be a highly-automatedly driving vehicle or a vehicle for highly automated driving. The at least one vehicle camera may be mounted or permanently installed in the vehicle. The motion state may be represented by at least one numerical value that indicates a static motion state, a dynamic motion state, and additionally or alternatively a motion state that with an ascertained probability is between static and dynamic. The correspondence algorithm may be, for example, the so-called optical flow or the like. Correspondences may be recognized between temporally successive images of the image data. The correspondences may be, for example, point correspondences or correspondences between lines, surfaces, or more complex shapes in the images. Based on the correspondences, suitable movability measures or dynamic object measures may be derived in order to indicate a dynamic motion state. It may be deduced from image correspondences whether the correspondence belongs to the static world or to a moving object. Such a measure may be, for example, an angular deviation from the epipolar line. A movability measure may be generated using the correspondences as well as further processing rules. For this purpose, movements that do not correspond to an expected behavior of the static world, such as epipolar violations, epipolar-compliant movements outside an expected value range of point correspondences of the static world, and/or epipolar-compliant movements that are remote from the camera and for which a negative depth would be obtained in the triangulation, may be detected. In addition, movements that violate additional assumptions, such as the planarity assumption, may be detected. Movability measures may represent measures for detecting dynamic object pixels or for identifying dynamic objects. The pieces of quality information may represent (co)variances, distribution density functions, or abstract measures with regard to a quality, for example a reliability, robustness, or the like, of the correspondences or of the correspondence algorithm.

In addition, the method may include a step of carrying out a temporal filtering of the dynamic object probabilities, using the correspondences, in order to generate filtered dynamic object probabilities that indicate the motion state.

A determination of a confidence value may be carried out for each filtered dynamic object probability in the step of carrying out. The confidence value may indicate how reliably, and additionally or alternatively how accurately, the filtered dynamic object probability describes the motion state.

According to one specific embodiment of the present invention, in the step of carrying out, a binarization of the filtered dynamic object probabilities may be carried out using a threshold value comparison. The binarized filtered dynamic object probabilities may indicate the motion state as static or dynamic. Such a specific embodiment provides the advantage that an even more reliable decision may be made as to whether pixels belong to a static object or to a moving or dynamic object, and thus whether a static or dynamic object is present in the vehicle surroundings. In addition, the number of objects erroneously recognized as dynamic may be further reduced.

In addition, the temporal filtering may be carried out in the step of carrying out, using a recursive filter and additionally or alternatively a T storage element. The recursive filter may be a first-order recursive filter. The T storage element may be a T flip-flop. Such a specific embodiment provides the advantage that the temporal filtering of the previously determined dynamic object probabilities may be easily and reliably carried out.

Furthermore, a fusion, and additionally or alternatively an accumulation, of filtered dynamic object probabilities that are generated in at least one preceding time increment with filtered dynamic object probabilities that are generated in an instantaneous time increment may be carried out in the step of carrying out. The filtered dynamic object probabilities generated in at least one preceding time increment may be stored. In addition, the filtered dynamic object probabilities generated in at least one preceding time increment may be transformed, using the correspondences, into the instantaneous time increment. Such a transformation may also be referred to as so-called warping. Such a specific embodiment provides the advantage that a low-pass behavior may be achieved which ensures that short-term measurement outliers are not erroneously interpreted as a dynamic object.

The fusion and additionally or alternatively the accumulation may be carried out using a weighting value for weighting the filtered dynamic object probabilities that are generated in at least one preceding time increment. The weighting value may be set as a function of over how many preceding time increments the filtered dynamic object probabilities generated in at least one preceding time increment have accumulated. Such a specific embodiment provides the advantage that the weighting value thus obtained may be used as a quality criterion for the fused dynamic object probability.

In addition, an error propagation method and additionally or alternatively a machine-learned model may be used in the step of generating. The error propagation method may be a Gaussian error propagation method. Such a specific embodiment provides the advantage that random noise effects may be reliably and accurately compensated for to avoid a false detection. It may advantageously be checked as to whether a measurement indicating dynamic behavior was more likely caused by noise or by an actual movement.

Moreover, in accordance with an example embodiment of the present invention, a method for activating a vehicle system of a vehicle is provided, the method including the following steps:

Determining a motion state of at least one object in the surroundings of the vehicle according to one of the specific example embodiments of the method described above; and Generating a control signal for output to the vehicle system, using the motion state, in order to activate the vehicle system.

The vehicle system may be a driver assistance system, a control system for highly automated driving, and additionally or alternatively some other vehicle system for controlling vehicle functions based on recognized objects in the surroundings of the vehicle.

The present invention also provides a device that is designed to carry out, control, or implement the steps of one variant of a method provided herein in appropriate units. In addition, the object underlying the present invention may be quickly and efficiently achieved via this embodiment variant of the present invention in the form of a device.

For this purpose, in accordance with an example embodiment of the present invention, the device may include at least one processing unit for processing signals or data, at least one memory unit for storing signals or data, at least one interface to a sensor or to an actuator for reading in sensor signals from the sensor or for outputting data signals or control signals to the actuator, and/or at least one communication interface for reading in or outputting data that are embedded in a communication protocol. The processing unit may be, for example, a signal processor, a microcontroller, or the like, and the memory unit may be a flash memory, an EEPROM, or a magnetic memory unit. The communication interface may be designed for reading in or outputting data wirelessly and/or in a hard-wired manner; a communication interface which may read in or output the line-bound data may read in these data electrically or optically, for example, from an appropriate data transmission line, or output same to an appropriate data transmission line.

In the present context, a device may be understood to mean an electrical device that processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present on a microcontroller, for example, in addition to other software modules.

Also advantageous is a computer program product or computer program including program code which may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

Exemplary embodiments of the present invention are illustrated in the figures and explained in greater detail in the description below.

DETAILED DESCRIPTION OF EXAMPLE EMBODIMENTS

Before the exemplary embodiments are discussed in greater detail below, the background of the exemplary embodiments is briefly explained.

Results of correspondence methods, for example optical flow, may frequently be noisy. This noise may result in correspondences to scene points that are actually static being erroneously interpreted as dynamic. Such misinterpretations are undesirable in particular in the field of driver assistance or for automatic driving, since they may result in unintended and unexpected system responses, for example unwarranted triggering of emergency braking. Such correspondence noise may in turn be subdivided into random components, for example measurement noise of the correspondence algorithm, noise of the image data etc., and systematic components. The latter in particular represent a challenge, since they may generally result in large deviations or outliers in the correspondences, and could thus be interpreted as a dynamic object. Such systematic noise effects are often caused by an image texture, for example by periodic structures in the image, weakly textured surfaces in the image, or an aperture problem that may frequently occur, for example, along lines and hard texture edges in the image. However, effects that already occur during an image recording and that violate certain standard assumptions for the subsequent algorithmic chain are also relevant here. Examples of such assumptions are 1) simultaneous exposure, with an identical length, of all pixels in the image (global shutter with constant or linear exposure) and 2) known geometric transformation of a 3D point in the world to its projection onto the 2D image area (intrinsic calibration). Assumption 1) is violated, for example, for image recordings with high dynamic range (HDR), in which portions of the image are possibly exposed for different periods of time, depending on their brightness. The associated correspondences may have different lengths due to such differences in the exposure time. Likewise, rolling shutter cameras may possibly violate assumption 1), since the image is exposed line by line, and is thus distorted when the camera and/or object move(s). Assumption 2) is violated, for example, when optical elements such as a windshield impart additional distortions to the image that were not known to the camera manufacturer during the calibration process. Overall, it may thus be concluded that conventional detection methods for dynamic objects may be susceptible to various interference or noise effects, which may be minimized or avoided according to exemplary embodiments. In particular, the latter-described systematic effects represent a challenge when standard, in particular inexpensive, cameras are used in series products, which may be overcome according to exemplary embodiments.

In the following description of advantageous exemplary embodiments of the present invention, identical or similar reference numerals are used for the elements having a similar action which are illustrated in the various figures, and a repeated description of these elements is dispensed with.

Figure 1:
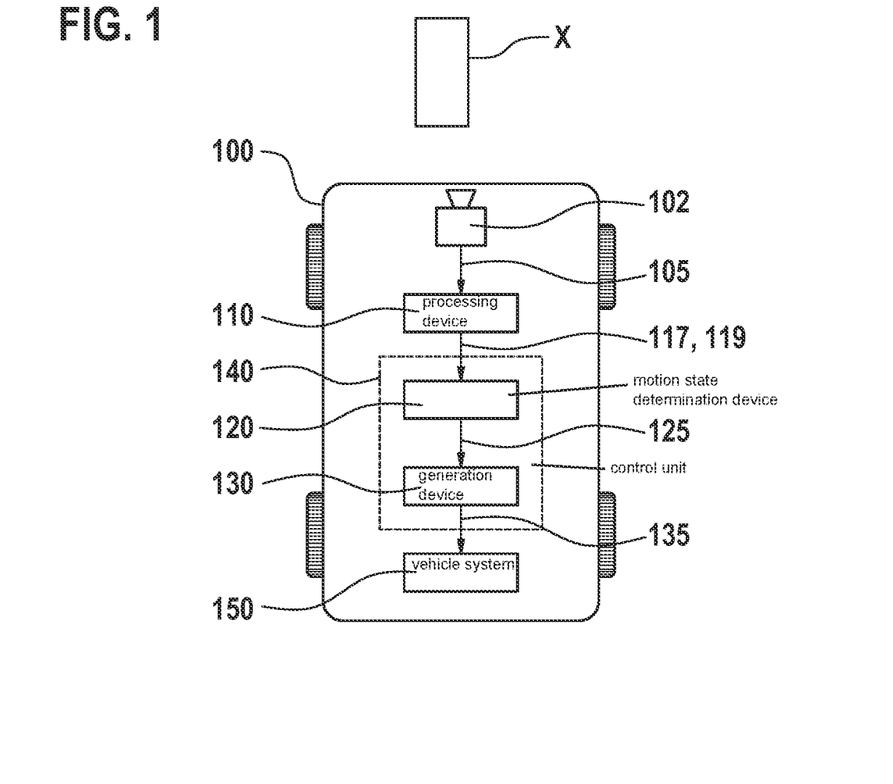
FIG. 1 shows a schematic illustration of a vehicle including a device according to one exemplary embodiment of the present invention.

FIG. 1 shows a schematic illustration of a vehicle 100 including a device 120 according to one exemplary embodiment. Vehicle 100 is a motor vehicle, for example a land vehicle, in particular a passenger automobile, a truck, or some other commercial vehicle. An object X is situated in the surroundings of vehicle 100 strictly by way of example. According to the exemplary embodiment illustrated here, vehicle 100 includes strictly by way of example a vehicle camera 102, a processing device 110, device 120, a generation device 130, a control unit 140, and strictly by way of example a vehicle system 150.

Vehicle camera 102 is designed to record or detect the surroundings of vehicle 100, and thus also object X. In addition, vehicle camera 102 is designed to provide image data 105 that represent the surroundings of vehicle 100, and thus also object X. Processing device 110 is designed to recognize correspondences between pixels in successive images represented by image data 105, using image data 105 with the aid of a correspondence algorithm. In addition, processing device 110 is designed to generate movability measures (dynamic object measures) 117 as continuous measured values for detecting moving object pixels, using the correspondences, and to generate a quality of pieces of quality information 119 indicating the correspondences. Furthermore, processing device 110 is designed to provide generated movability measures 117 and pieces of quality information 119.

Device 120 is designed to determine a motion state of the at least one object X in the surroundings of vehicle 100. In addition, device 120 is designed to read in generated movability measures 117 and pieces of quality information 119 from processing device 110. Device 120 or determining device is designed to provide a status signal 125 that indicates or represents the determined motion state of the at least one object X in the surroundings of vehicle 100, using movability measures 117 and pieces of quality information 119. In particular, device 120 is discussed in even greater detail with reference to the figures described below.

According to the exemplary embodiment illustrated here, device 120 and generation device 130 are part of control unit 140. Control unit 140 is designed to activate the at least one vehicle system 150 of vehicle 100. For this purpose, generation device 130 is designed to generate a control signal 135, using the motion state represented by status signal 125, for output to vehicle system 150 in order to activate vehicle system 150. Vehicle system 150 may be a driver assistance system, a control system for highly automated driving, or some other vehicle system.

Figure 2:
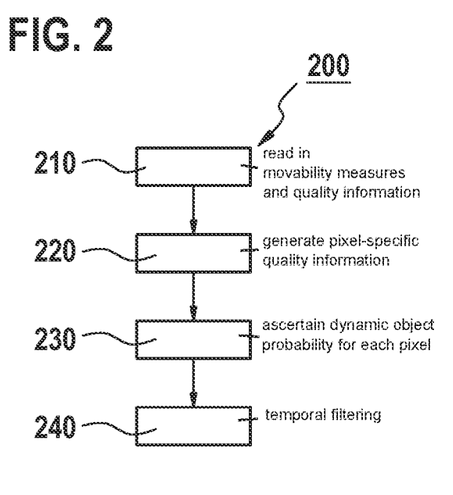
FIG. 2 shows a flowchart of a method for determining according to one exemplary embodiment of the present invention.

FIG. 2 shows a flowchart of a method 200 for determining according to one exemplary embodiment. Method 200 for determining is executable in order to determine a motion state of at least one object in the surroundings of a vehicle. Method 200 for determining is executable in conjunction with the vehicle from FIG. 1 or a similar vehicle. Method 200 for determining is thus executable in conjunction with a vehicle that includes at least one vehicle camera for providing image data that represent the surroundings. In addition, method 200 for determining is executable using the device from FIG. 1 or a similar device. Method 200 for determining includes a step 210 of reading in, a step 220 of generating, a step 230 of ascertaining, and optionally a step 240 of carrying out. Generated movability measures and pieces of quality information are read in in step 210 of reading in by processing the image data. The movability measures include generated continuous measured values for detecting moving object pixels, using correspondences, recognized with the aid of a correspondence algorithm, between pixels in successive images represented by the image data. The pieces of quality information indicate a quality of the correspondences as a function of at least noise-related interfering influences.

Pixel-specific pieces of quality information are generated in step 220 of generating, using the read-in pieces of quality information. The pixel-specific pieces of quality information indicate for each pixel the quality of the correspondences. A dynamic object probability for each pixel is ascertained in step 230 of ascertaining, using the movability measures and the pixel-specific pieces of quality information. The dynamic object probability indicates for each pixel, as a motion state, the probability of belonging to a moving object or to a static object.

A temporal filtering of the dynamic object probabilities is carried out in step 240 of carrying out, using the correspondences, in order to generate filtered dynamic object probabilities that indicate the motion state.

Figure 3:
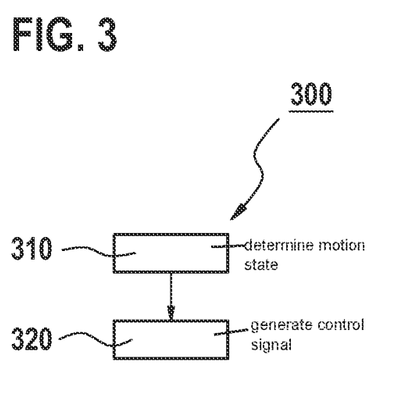
FIG. 3 shows a flowchart of a method for activating according to one exemplary embodiment of the present invention.

FIG. 3 shows a flowchart of a method 300 for activating according to one exemplary embodiment. Method 300 for activating is executable in order to activate a vehicle system of a vehicle. Method 300 is executable for activating in conjunction with the vehicle from FIG. 1 or a similar vehicle. In addition, method 300 is executable for activating, using the control unit from FIG. 1 or a similar control unit. Method 300 for activating includes a step 310 of determining and a step 320 of generating.

The motion state of at least one object in the surroundings of the vehicle is determined in step 310 of determining. Step 310 of determining includes the steps of the method for determining from FIG. 2 or a similar method as substeps. A control signal for output to the vehicle system is generated in step 320 of generating, using the motion state determined in step 310 of determining, in order to activate the vehicle system.

Figure 4:
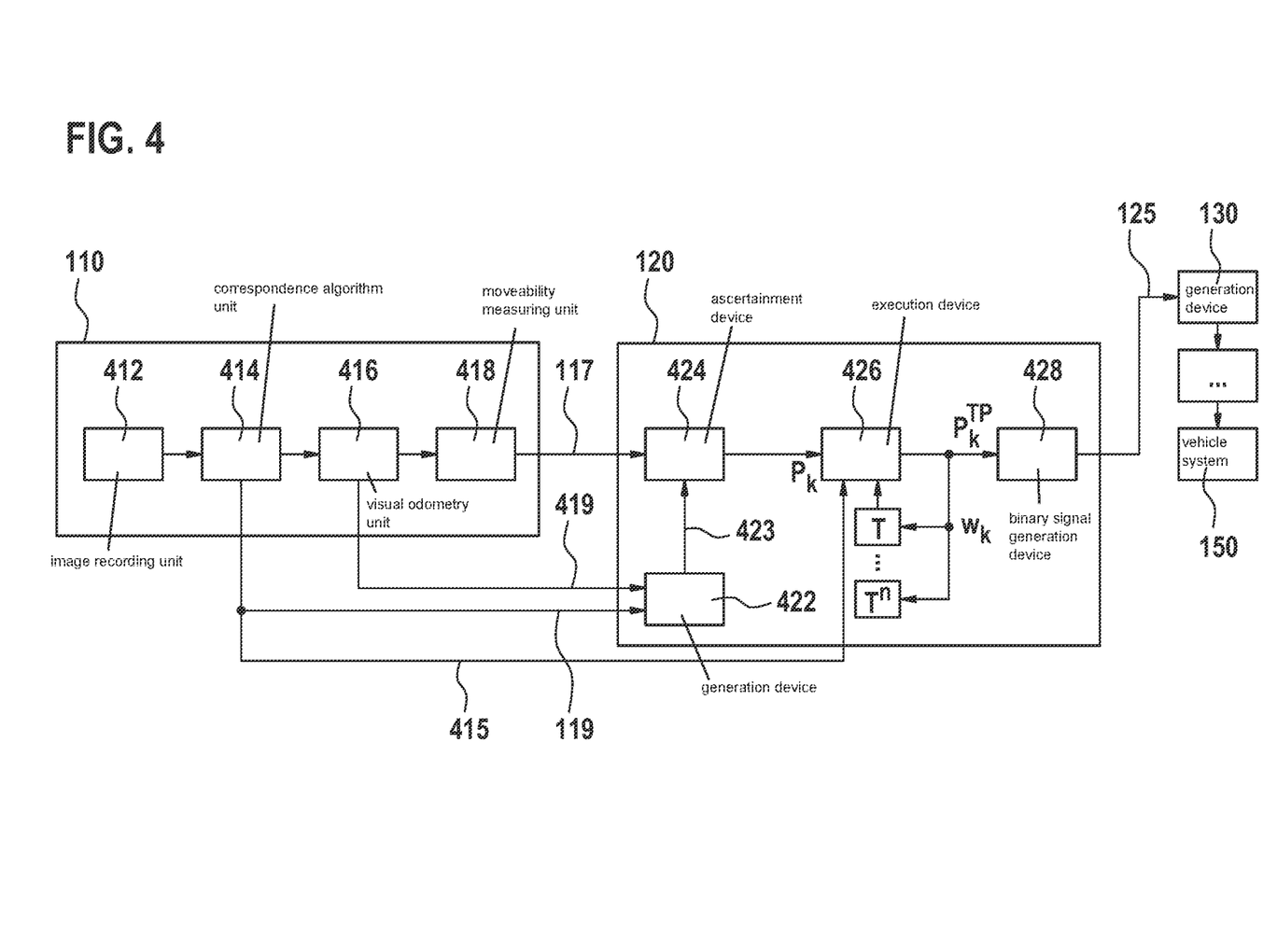
FIG. 4 shows a schematic illustration of a device according to one exemplary embodiment of the present invention.

FIG. 4 shows a schematic illustration of a device 120 according to one exemplary embodiment. Device 120 corresponds to or resembles the device from FIG. 1. FIG. 4 also shows a processing device 110 that corresponds to or resembles the processing device from FIG. 1, a generation device 130 that corresponds to or resembles the generation device from FIG. 1, and a vehicle system 150 that corresponds to or resembles the vehicle system from FIG. 1.

Processing device 110 includes an image recording unit 412, a correspondence algorithm unit 414, a visual odometry unit 416, and a movability measuring unit 418. Processing device 110 is designed to apply a geometric detection method for the case of a moving camera. Correspondences between temporally successive images are used as the basis for geometric detection methods for detecting moving objects.

Image recording unit 412 is designed to carry out an image recording based on the image data from the vehicle camera, or in other words, to record temporally successive images. Correspondence algorithm unit 414 is designed to execute a correspondence algorithm on the recorded images, for example the so-called optical flow. In other words, correspondence algorithm unit 414 is designed to determine or recognize point correspondences, for example, between the images, for example using optical flow and/or tracking of prominent pixels. As an alternative to point correspondences, for example correspondences between lines, surfaces, or more complex shapes in the images are determined. Correspondence algorithm unit 414 is also designed to provide a quality of the correspondences or quality of pieces of quality information 119 indicating their ascertainment, as well as correspondence data 415. Visual odometry unit 416 is designed to determine a proper motion of the vehicle camera for the correspondences or point correspondences. Visual odometry unit 416 is also designed to provide a quality of the proper motion or quality of additional pieces of quality information 419 indicating their ascertainment.

Movability measuring unit 418 is designed to generate and provide movability measures 117. Movability measures 117 represent measures, generated for each pixel, for detecting dynamic objects, for example angles of epipolar violations. For this purpose, movements that do not correspond to an expected behavior of the static world are detected with the aid of movability measuring unit 418, for example epipolar violations such as crossing objects, epipolar-compliant movements outside an expected value range of the point correspondences of the static world, so-called flow vector bound, for example rapidly oncoming objects, and/or epipolar-compliant movements that veer away from the camera and for which a negative depth would be obtained in the triangulation, so-called negative depth constraint, for example objects that are passing. In addition, movements that violate additional assumptions, such as the planarity assumption, i.e., objects actually move on a planar surface but a triangulation of dynamic objects displaces them below or above the plane in question, are detected with the aid of movability measuring unit 418.

Movability measuring unit 418 generates at least one of the listed measures for detecting dynamic object pixels (epipolar violation, flow vector bound, negative depth constraint, plane-related measures), using movability measures 117 or so-called dynamic object measures. However, even further measures for identifying dynamic objects may be additionally computed here. Measures that are obtained not geometrically, but rather based on data, i.e., via machine learning, would likewise be possible. Data from other types of sensors, for example laser scanners, radar, digital map, etc., could also be used here when it is possible to project them into the instantaneous camera image. It is pointed out that movability measures 117 are not generated and provided solely as a binary decision, i.e., a pixel is either static or dynamic, but, rather, in multiple stages as a measured variable, for example angles of the epipolar violation, length of the flow vector, value of the negative depth, distance from the base plane, or the like.

Device 120 is designed to determine a motion state of at least one object in the surroundings of a vehicle. Device 120 includes a generation device 422, an ascertainment device 424, and an execution device 426. In addition, according to the exemplary embodiment illustrated here a plurality of T storage elements T through T" are shown. Also shown is a binary signal generation unit 428 that is likewise optionally included by device 120. Device 120 is designed to read in movability measures 117 and pieces of quality information 119 from processing device 110. In addition, device 120 is designed to read in additional pieces of quality information 419 and correspondence data 415.

Generation device 422 is designed to generate pixel-specific pieces of quality information 423, using read-in pieces of quality information 119 and optionally also additional pieces of quality information 419. Pixel-specific pieces of quality information 423 indicate the quality of the correspondences for each pixel. In other words, generation device 422 is designed to transform pieces of quality information 119 and 419 into a quality of the dynamic object measures or movability measures 117, for example based on a lookup table. Ascertainment device 424 is designed to ascertain a dynamic object probability $P_k$ for each pixel, using read-in movability measures 117 and pixel-specific pieces of quality information 423. Dynamic object probability $P_k$ indicates for each pixel the probability of belonging to a moving object or to a static object. In other words, ascertainment device 424 is designed to take random noise into account in the optical flow, dynamic object probability $P_k$ being derived here from movability measures 117. Execution device 426 is designed to carry out temporal filtering of dynamic object probabilities $P_k$, using the correspondences or correspondence data 415, to generate filtered or fused dynamic object probabilities $P_k^{TP}$ which indicate the motion state. In other words, execution device 426 is designed to take systematic noise into account, a robustness against windshield distortions, HDR effects, etc., being increased by temporal filtering.

A compensation for random noise effects is achievable with the aid of generation device 422 and ascertainment device 424. Pieces of quality information 119 of the correspondence algorithm, for example optical flow, or of correspondence algorithm unit 414 and optionally also of additional or further pieces of quality information 419 of the visual odometry or of visual odometry unit 416 are used as a countermeasure for random noise effects. These pieces of information may be present, for example, in the form of (co)variances, distribution density functions, or abstract measures. Generation device 422 is designed to convert these pieces of quality information 119 and/or 419 so that for each pixel they describe the quality of measured movability measures 117 or dynamic object measures. Error propagation methods, for example Gaussian error propagation methods, or learned model relationships or machine learning may be utilized. As a result, a specific or pixel-specific piece of quality information 423, for example in the form of a variance or distribution density function, is likewise available for each movability measure 117. The compensation for random noise effects then takes place with the aid of ascertainment device 424, which is designed to deduce for each pixel, based on movability measures 117 and associated pieces of quality information 423, a dynamic object probability $P_k$ as to whether the pixel is a dynamic object. A check is made here as to whether a measurement was more likely caused by noise or by an actual movement. For example, an angle of the epipolar violation of 1 degree is measured at a pixel. If the associated optical flow results in a standard deviation of 0.1 degree there, it is highly likely that this is a dynamic object pixel. In contrast, if the standard deviation is greater, for example 0.8 degree, the likelihood of a dynamic object is significantly less.

A compensation for systematic noise effects is achievable with the aid of execution device 426 and optionally binary signal generation unit 428, discussed in greater detail below. The compensation for systematic noise effects utilizes the temporal consistency of moving objects and of the static world, and assumes that transitions between the two take place slowly, i.e., not abruptly from image to image, but instead rather slowly over a series of images. Due to temporal filtering of previously determined dynamic object probabilities $P_k$, a low-pass character is applied which ensures that short-term measurement outliers are not erroneously interpreted as a dynamic object.

According to one exemplary embodiment, the temporal filtering takes place in such a way that at least the filtering result of the preceding time increment is stored, for which purpose device 120 includes a plurality of T storage elements T through T", which at the instantaneous point in time are fused with the instantaneous dynamic object probability in execution device 426. For this purpose, the results from the preceding time increments are initially transformed, also referred to as "warping," into the instantaneous time increment with the aid of the correspondences or correspondence data 415.

According to one exemplary embodiment, the temporal filtering or fusion or accumulation of dynamic object probabilities $P_k$ is carried out via a first-order recursive filter. In this case, instantaneous dynamic object probability $P_k$ and previous warped fusion result $P_{k-1}^{TP,warp}$ are accumulated $$P_k^{TP} = \frac{w_{k-1}^{warp} P_{k-1}^{TP,warp} + P_k}{w_{k-1} + 1}$$

for each pixel, $w_{k-1}^{warp}$ representing a weight or a weighting value that counts, for example, how often old measurement $P_{k-1}^{TP,warp}$ could be accumulated over the time period. The same as with the previous dynamic object probabilities, here as well the preceding weighting values are warped into the instantaneous time increment: $w_{k-1} \rightarrow w_{k-1}^{warp}$. After the fusion, the instantaneous weighting value is incremented: $w_k = w_{k-1}^{warp} + 1$. If there is no instantaneous measurement at a pixel, for example because no flow vector is determinable there, the weighting value is once again reset to $w_k = 0$. According to one exemplary embodiment, resulting weighting value $w_k$ is used as a quality criterion or confidence for filtered or fused dynamic object probability $P_k^{TP}$. A higher weighting value means that the associated dynamic object probability has already been confirmed numerous times. The confidence in such a measurement is accordingly high.

According to the exemplary embodiment illustrated here, device 120 also includes binary signal generation unit 428. Binary signal generation unit 428 is designed to carry out a binarization of filtered dynamic object probabilities $P_k^{TP}$, using a threshold value comparison. The binarized filtered dynamic object probabilities indicate the motion state as static or dynamic. Depending on the application, a binary decision of static/dynamic may thus optionally be made for each pixel. This decision may be made, for example, by simple limiting value application to dynamic object probabilities $P_k^{TP}$. However, more complex operations, such as a spatial aggregation in the image, a movability segmentation, an object detection, etc., are also possible. It is pointed out here that the dynamic object probability in combination with the associated confidence represents a measure for detecting dynamic objects that is improved over conventional approaches.

Device 120 is designed to output status signal 125 to generation device 130. Generation device 130 is also designed to carry out a detection of dynamic objects. Lastly, vehicle system 150 is activatable in this way.

Figure 5:
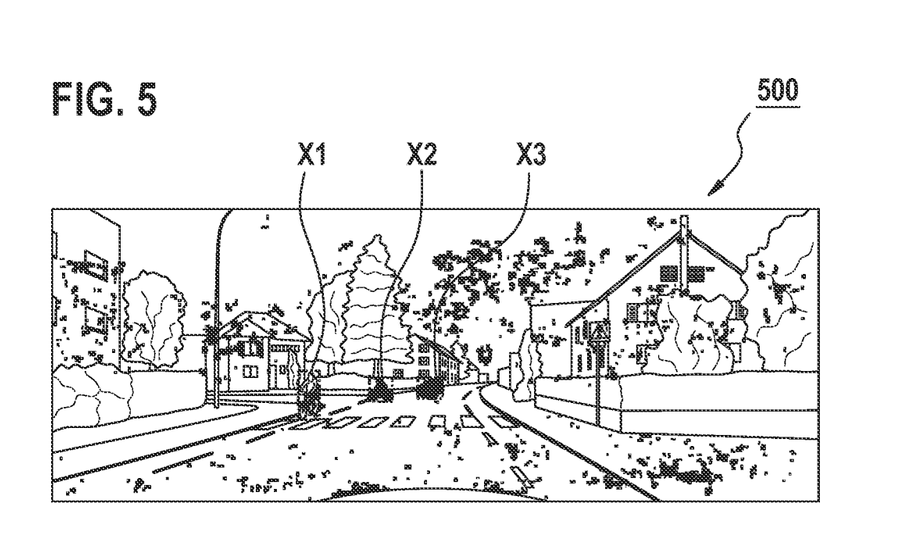
FIG. 5 shows an example diagram of processed image data.

FIG. 5 shows an example diagram 500 of processed image data. The image data are data that are processed with the aid of the processing device from FIG. 1 or FIG. 4. In addition, a first object X1, a second object X2, and a third object X3 are shown in example diagram 500. FIG. 5 shows as an example which pixels are classified as dynamic when only one movability measure, for example the angle of the epipolar violation, is compared to a limiting value. It is noteworthy that, in addition to a crossing cyclist, second object X2, and an oncoming vehicle, third object X3, which are correctly recognized as moving, a very large number of false-positive detections, i.e., pixels erroneously classified as dynamic, are also present.

Figure 6:
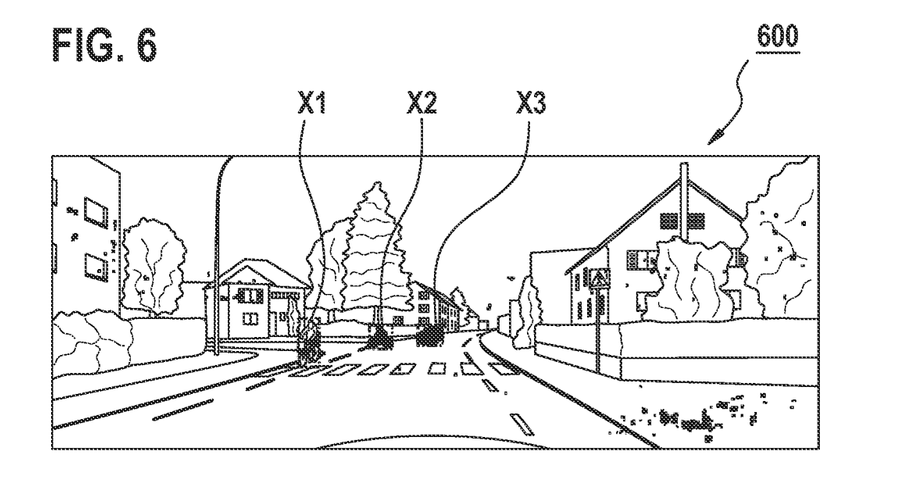
FIG. 6 shows an example diagram of image data that are processed with the aid of a device according to one exemplary embodiment of the present invention.

FIG. 6 shows an example diagram 600 of image data that are processed with the aid of a device according to one exemplary embodiment. The device corresponds to or resembles the device from FIG. 1 or FIG. 4. Example diagram 600 corresponds to the example diagram from FIG. 5, except that the dynamic object probabilities of the ascertainment device of the device have been used here for generating example diagram 600. FIG. 6 shows the potential for avoiding false-positive detections based solely on the compensation for random noise components. Virtually all false detections in the sky and on the buildings are suppressed, whereas the detections on the moving objects remain unchanged. An increased number of false detections still remain only in the lower right area of the image. In the present example, these are attributable to a distortion by the windshield, i.e., a systematic effect.

Figure 7:
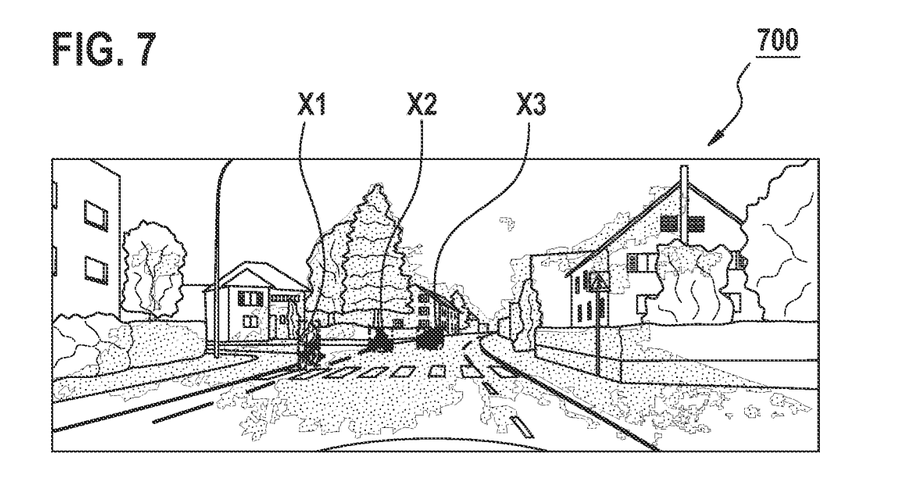
FIG. 7 shows an example diagram of image data that are processed with the aid of a device according to one exemplary embodiment of the present invention.

FIG. 7 shows an example diagram 700 of image data that are processed with the aid of a device according to one exemplary embodiment. The device corresponds to or resembles the device from FIG. 1 or FIG. 4. Example diagram 700 corresponds to the example diagram from FIG. 6, except that filtered dynamic object probabilities $P_k^{TP}$ of the execution device of the device have been used here for generating example diagram 700. FIG. 7 thus shows filtered dynamic object probability $P_k^{TP}$, weighting value $w_k$ being codable via a color saturation of example diagram 700: The greater the saturation, the higher the weighting value, i.e., the longer the associated dynamic object probability could thus far be observed. It is thus possible to distinguish between certain and uncertain measurements. This results in a high level of confidence with regard to second object X2 and with regard to the static world.

Figure 8:
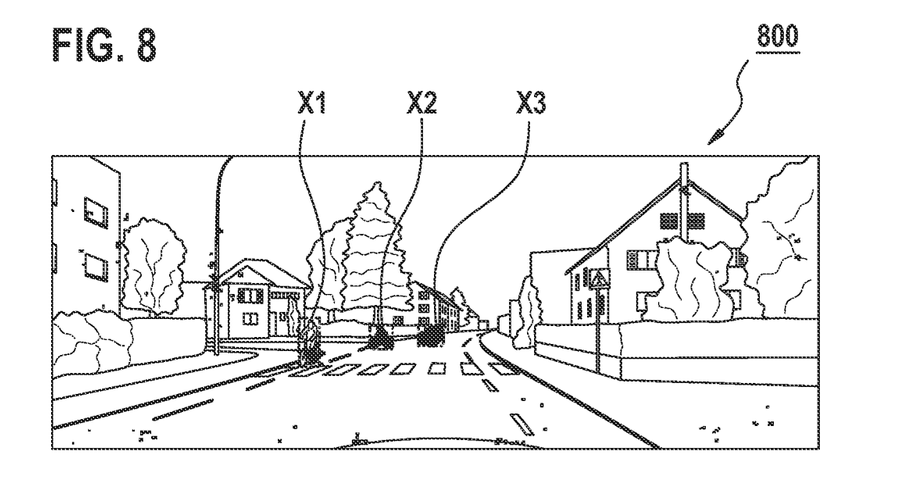
FIG. 8 shows an example diagram of image data that are processed with the aid of a device according to one exemplary embodiment of the present invention.

FIG. 8 shows an example diagram 800 of image data that are processed with the aid of a device according to one exemplary embodiment. The device corresponds to or resembles the device from FIG. 1 or FIG. 4. Example diagram 800 corresponds to the example diagram from FIG. 7, except that the binarized dynamic object probabilities of binary signal generation unit 428 of the device have been used here for generating example diagram 800. FIG. 8 thus shows an example of a binary dynamic object probability that is virtually free of false-positive detections and shows an even higher level of confidence with regard to third object X3.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for determining a motion state of at least one object in surroundings of a vehicle, the vehicle including at least one vehicle camera configured to provide image data that represent the surroundings, the method comprising the following steps:

reading in movability measures and pieces of quality information that are generated by processing the image data, the movability measures including generated continuous measured values for detecting moving object pixels, using correspondences, recognized using a correspondence algorithm, between pixels in successive images represented by the image data, the pieces of quality information indicating a quality of the correspondences as a function of at least noise-related interfering influences;

generating pixel-specific pieces of quality information using the read-in pieces of quality information, the pixel-specific pieces of quality information indicating for each pixel the quality of the correspondences; and ascertaining a dynamic object probability for each pixel, using the movability measures and the pixel-specific pieces of quality information, the dynamic object probability indicating for each pixel, as the motion state, the probability of belonging to a moving object or to a static object.

2. The method as recited in claim 1, further comprising:
carrying out a temporal filtering of the dynamic object probabilities, using the correspondences, to generate filtered dynamic object probabilities that indicate the motion state.

3. The method as recited in claim 2, wherein in the carrying out step, a determination of a confidence value is carried out for each of the filtered dynamic object probabilities, the confidence value indicating how reliably and/or how accurately the filtered dynamic object probability describes the motion state.

4. The method as recited in claim 2, wherein in the carrying out step, a binarization of the filtered dynamic object probabilities is carried out using a threshold value comparison, the binarized filtered dynamic object probabilities indicating the motion state as static or dynamic.

5. The method as recited in claim 2, wherein in the carrying out step, the temporal filtering is carried out using a recursive filter and/or a T storage element.

6. The method as recited in claim 2, wherein a fusion and/or an accumulation of filtered dynamic object probabilities that are generated in at least one preceding time increment with filtered dynamic object probabilities that are generated in an instantaneous time increment, is carried out in the carrying out step, the filtered dynamic object probabilities generated in at least one preceding time increment being stored, the filtered dynamic object probabilities generated in at least one preceding time increment being transformed, using the correspondences, into the instantaneous time increment.

7. The method as recited in claim 6, wherein the fusion and/or accumulation is carried out using a weighting value for weighting the filtered dynamic object probabilities that are generated in at least one preceding time increment, the weighting value being set as a function of over how many preceding time increments the filtered dynamic object probabilities generated in at least one preceding time increment have accumulated.

8. The method as recited in claim 1, wherein an error propagation method and/or a machine-learned model, is used in the generating step.

9. A method for activating a vehicle system of a vehicle, the method comprising the following steps:
determining a motion state of at least one object in surroundings of the vehicle, the determining including:
reading in movability measures and pieces of quality information that are generated by processing the image data, the movability measures including generated continuous measured values for detecting moving object pixels, using correspondences, recognized using a correspondence algorithm, between pixels in successive images represented by the image data, the pieces of quality information indicating a quality of the correspondences as a function of at least noise-related interfering influences,
generating pixel-specific pieces of quality information using the read-in pieces of quality information, the pixel-specific pieces of quality information indicating for each pixel the quality of the correspondences, and
ascertaining a dynamic object probability for each pixel, using the movability measures and the pixel-specific pieces of quality information, the dynamic object probability indicating for each pixel, as the motion state, the probability of belonging to a moving object or to a static object; and
generating a control signal for output to the vehicle system, using the motion state, to activate the vehicle system.

10. A device configured to determine a motion state of at least one object in surroundings of a vehicle, the vehicle including at least one vehicle camera configured to provide image data that represent the surroundings, the device configured to:
read in movability measures and pieces of quality information that are generated by processing the image data, the movability measures including generated continuous measured values for detecting moving object pixels, using correspondences, recognized using a correspondence algorithm, between pixels in successive images represented by the image data, the pieces of quality information indicating a quality of the correspondences as a function of at least noise-related interfering influences;
generate pixel-specific pieces of quality information using the read-in pieces of quality information, the pixel-specific pieces of quality information indicating for each pixel the quality of the correspondences; and
ascertain a dynamic object probability for each pixel, using the movability measures and the pixel-specific pieces of quality information, the dynamic object probability indicating for each pixel, as the motion state, the probability of belonging to a moving object or to a static object.

11. A non-transitory machine-readable memory medium on which is stored a computer program for determining a motion state of at least one object in surroundings of a vehicle, the vehicle including at least one vehicle camera configured to provide image data that represent the surroundings, the computer program, when executed by a computer, causing the computer to perform the following steps:
reading in movability measures and pieces of quality information that are generated by processing the image data, the movability measures including generated continuous measured values for detecting moving object pixels, using correspondences, recognized using a correspondence algorithm, between pixels in successive images represented by the image data, the pieces of quality information indicating a quality of the correspondences as a function of at least noise-related interfering influences;
generating pixel-specific pieces of quality information using the read-in pieces of quality information, the pixel-specific pieces of quality information indicating for each pixel the quality of the correspondences; and
ascertaining a dynamic object probability for each pixel, using the movability measures and the pixel-specific pieces of quality information, the dynamic object probability indicating for each pixel, as the motion state, the probability of belonging to a moving object or to a static object.

* * * * *